United States Patent
Alexander

(10) Patent No.: US 12,301,526 B2
(45) Date of Patent: May 13, 2025

(54) SYSTEM AND METHOD FOR DISTRIBUTED COMMUNICATIONS AND CONTROL FOR ELECTRIC UTILITY GRID

(71) Applicant: Eaton Intelligent Power Limited, Dublin (IE)

(72) Inventor: Roger Alexander, Rockville, MD (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/193,992

(22) Filed: Mar. 31, 2023

(65) Prior Publication Data

US 2023/0318998 A1  Oct. 5, 2023

Related U.S. Application Data

(60) Provisional application No. 63/325,897, filed on Mar. 31, 2022.

(51) Int. Cl.
 *H04L 51/07* (2022.01)
 *G01D 4/00* (2006.01)
 *H04L 67/56* (2022.01)

(52) U.S. Cl.
 CPC ............. *H04L 51/07* (2022.05); *G01D 4/004* (2013.01); *H04L 67/56* (2022.05)

(58) Field of Classification Search
 CPC ..... H04L 51/07; H04L 67/56; H04L 12/2825; H04L 12/2818; H04L 67/12; G01D 4/004; H04W 4/38
 See application file for complete search history.

(56) References Cited

U.S. PATENT DOCUMENTS

| | | | |
|---|---|---|---|
| 9,733,274 B2 * | 8/2017 | Pietrowicz | H04L 63/1408 |
| 11,022,994 B2 | 6/2021 | Golden et al. | |
| 2003/0193405 A1 * | 10/2003 | Hunt | G01D 4/008 340/870.11 |
| 2010/0262313 A1 | 10/2010 | Chambers et al. | |
| 2013/0054044 A1 * | 2/2013 | Shaffer | H02J 13/00028 700/297 |
| 2014/0184424 A1 * | 7/2014 | Makgill, Jr. | H04Q 9/00 340/870.39 |

(Continued)

OTHER PUBLICATIONS

Extended European Search Report for Application No. 23165307.2 mailed Aug. 24, 2023.

(Continued)

*Primary Examiner* — Amine Benlagsir
(74) *Attorney, Agent, or Firm* — Merchant & Gould P.C.

(57) ABSTRACT

A system of communicating data to and between a client device in a residence and a utility network is provided. The system includes a proxy controller located at the residence and a first network configured to transmit and receive data between a central controller associated with the utility network and the proxy controller. The system further includes a second network configured to transmit and receive data between the proxy controller and the client device in the residence. The proxy controller is operative to receive data from the client device over the second network, aggregate the received data in a predefined format, store the aggregated data within the proxy controller, and send the aggregated data to a central controller over the first network.

20 Claims, 3 Drawing Sheets

(56) References Cited

U.S. PATENT DOCUMENTS

| | | | | |
|---|---|---|---|---|
| 2015/0003227 A1* | 1/2015 | Splitz | .................. | H04W 56/001 |
| | | | | 370/216 |
| 2018/0376373 A1* | 12/2018 | Liao | .................... | H04W 28/088 |
| 2019/0020220 A1 | 1/2019 | Lian et al. | | |
| 2020/0150705 A1* | 5/2020 | Golden | ................... | H04L 67/10 |
| 2020/0394329 A1* | 12/2020 | Jayaprakash | ....... | G06F 11/3419 |
| 2021/0072043 A1* | 3/2021 | Petitgrand | .............. | G01D 4/002 |

OTHER PUBLICATIONS

Zafar et al., "Home Energy Management System Concepts, Configurations, and Technologies for the Smart Grid," IEEE Access, vol. 8, pp. 119271-119286, DOI:10.1109/ACCESS.2020.3005244 (Jun. 26, 2020).

Office Action issued in Canadian Application No. 3,194,533 mailed Aug. 27, 2024 (4 pages).

* cited by examiner

SYSTEM AND METHOD FOR DISTRIBUTED COMMUNICATIONS AND CONTROL FOR ELECTRIC UTILITY GRID

CROSS-REFERENCE TO RELATED APPLICATION

This application claims priority to and the benefit of U.S. Provisional Patent Application No. 63/325,897, filed Mar. 31, 2022, and which is incorporated by reference herein in its entirety.

TECHNICAL FIELD

The present disclosure relates generally to electric utility grids. More specifically, the present disclosure relates to distributed communications and control for electric utility grids.

BACKGROUND

There has been an increasing emphasis in recent years on energy conservation. Electric utilities have also come under increasing pressure to reduce the need to fire up polluting power plants to serve peak demands, such as during hot summer days. Two ways in which utilities can perform these tasks are referred to as demand side management and supply side management. Demand side management refers to the selective reduction of energy demand in response to peak loading conditions. For examples, utilities install devices in the homes of participating consumers that, under utility control, selectively disable energy consuming devices (for example, hot water heaters or air conditioning units) in response to peak loading conditions. As another example, distributed energy resources provide a significant resource for addressing peak loading conditions, in shifting or modulating loads, as well as generation on the distribution network. However, current utility services infrastructure lacks provisioning and flexibility for managing a large number of distributed energy resources particularly where these resources are connected behind the customer meter. Therefore, it would be advantageous to provide more sophisticated control mechanisms to permit electric utilities and others to effectively monitor and control distributed energy resources.

SUMMARY

One aspect of the disclosure provides a method of transmitting and receiving data from a client device of a utility. The method includes receiving, by a proxy controller associated with a residence, data from a client device located in the residence over a second network. The client device comprises one or more of an energy consuming appliance and a distributed energy resource connected to a utility. The method further includes processing, by the proxy controller, the received data. Processing the data includes aggregating the received data in a predefined format. The method further includes storing, by the proxy controller, the aggregated data within the proxy controller. The method further includes sending, by the proxy controller, the aggregated data to a central controller over a first network.

Another aspect of the disclosure provides a system of communicating data to and between a client device in a residence and a utility network. The system includes a proxy controller located at the residence and a first network configured to transmit and receive data between a central controller associated with the utility network and the proxy controller. The system further includes a second network configured to transmit and receive data between the proxy controller and the client device in the residence. The proxy controller is operative to receive one or more notifications from the central controller over the first network, process the one or more notifications, generate one or more message based on the one or more notifications, and send the one or more message to the client device over the second network.

Yet another aspect of the disclosure provides a system of communicating data to and between a client device in a residence and a utility network. The system includes a proxy controller located at the residence and a first network configured to transmit and receive data between a central controller associated with the utility network and the proxy controller. The system further includes a second network configured to transmit and receive data between the proxy controller and the client device in the residence. The proxy controller is operative to receive data from the client device over the second network, aggregate the received data in a predefined format, store the aggregated data within the proxy controller, and send the aggregated data to a central controller over the first network.

BRIEF DESCRIPTION OF THE DRAWINGS

The accompanying drawings which are incorporated in and constitute a part of the description, illustrate several aspects of the disclosure. A brief description of the drawings is as follows.

DETAIL DESCRIPTION

Figure 1:
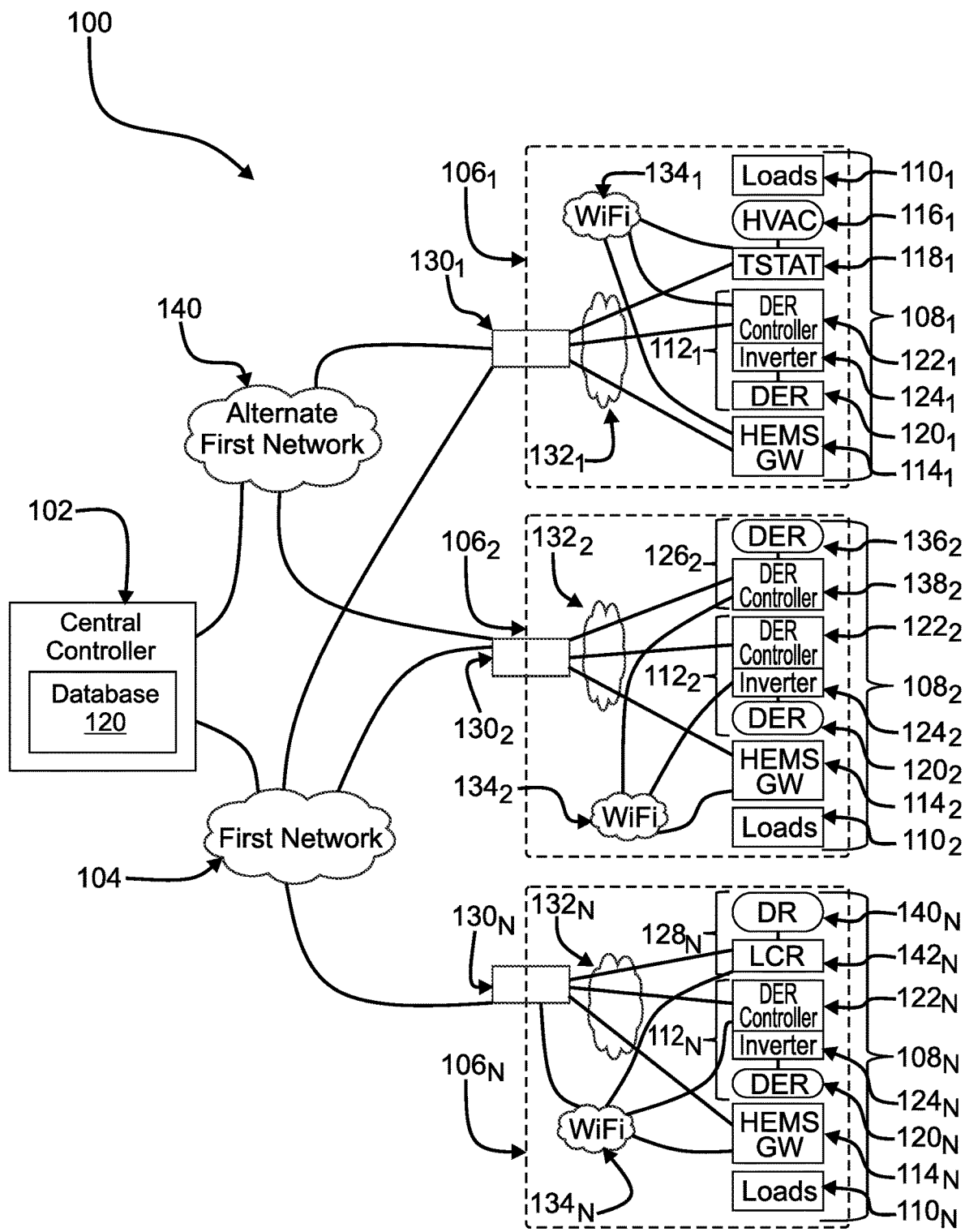
FIG. 1 illustrate a communications and control architecture in accordance with example embodiments.

Reference will now be made in detail to exemplary aspects of the present disclosure that are illustrated in the accompanying drawings. Wherever possible, the same reference numbers will be used throughout the drawings to refer to the same or like structure.

Utilities generally deploy a central control server, also referred to as a central controller, to manage and control the activities of a wide array of disparate client devices while adhering to preferences and individualized energy usage patterns of the premises in which those client devices are deployed. The client devices may be widely distributed across a large service area and interconnected via a range of available communications means. In addition, the client devices can be associated with different manufacturers and vendors that provide differing control capabilities as well as differing service agreements with service vendors and premise owners. To support scalability, the central controller may need to be capable of interacting with an increasing number and array of client devices. However, increasing scalability may require greater processing and communications infrastructure to allow the central controller to aggregate, interact and control larger numbers of client devices.

In addition to increased information state storage maintenance, there is a consequent increase in communications and centralized processing resources to manage and control an increased number of client devices. Implementing service control algorithms at the central controller becomes increasingly challenging where the central controller is to directly understand and manage the capabilities of the individual client devices as part of a joint system optimization and where close, frequent, and individually-customized device communications may be desired for control of the client devices. As the number of client devices and the time interval of controls increase, it becomes increasingly difficult to deliver optimized system control.

The disclosure provides an ability to distribute the problem by aggregating the client devices under distributed edge controllers, also referred to as proxy controllers, while maintaining overall centralized control coordination. For example, the disclosure provides communications and control architecture that minimizes and reduces redundant wide-area coordination and control data communications exchanges between a central controller and a distributed set of client devices. The disclosed communications and control architecture creates a system hierarchy in which the client devices communicate with localized proxy controllers. The proxy controllers filter, compress, and aggregate the control exchanges between the central controller and client devices. The proxy controllers can locally process activity and operating energy patterns of the client devices by performing, for example, localized, high-frequency meter data processing without the need to communicate that fine-grained data to the central controller. The proxy controllers can also locally collect and process information received with high frequency from the client devices without the need to communicate that detailed information to the central controller. In addition, the proxy controllers can use locally derived or collected information in its local control decision-making while providing aggregated data summaries that allow the central controller to manage arrays of client devices distributed across the extended population of end customer premises.

The disclosed two-level hierarchical control and communication system creates scalable and effective services control by distributing the functions of the central controller into distributed proxy controllers that are moved to the edge of the utility network and where the proxy controllers directly interact with a much smaller subset of the total population of client devices. The two-level control system allows the central controller interactions with client devices to be reduced since specific as well as full function communications and control exchanges take place only between the proxy controllers and the subset of client devices that each proxy controller is responsible for.

In certain examples, the proxy controllers are able to aggregate the information exchanged with the central controller and, therefore, minimize the communications and control interactions that flow from the central controller to the client devices at the edge of the utility system. The proxy controllers interact and coordinate with the central controller from which they are controlled. The proxy controllers, on behalf of the central controller, implement and engage in the communications and control interactions of the client devices or client control devices that control the client devices. Additionally, by coordinating the activity of a much smaller subset of the client devices that may have a shared local domain, the proxy controllers support further optimized local control within an edge domain while still being able to represent and reflect the control directives of the central controller. The proxy controllers support the local control in concert with the localized end-customer preferences and associated usage load or generation patterns of the client devices.

In examples, the disclosed hierarchical communications and control architecture, in addition to providing more efficient scalability as a number of proxy controllers grows, also supports a wide variety of heterogeneous communications capabilities between the central controller and the proxy controllers at the interface of the local edge domains. Because there is no direct communications interactions between the central controller and the client devices, the central controller is able to filter, group, and aggregate control commands to the proxy controllers. The proxy controllers then support the more specific and involved communications and control interactions that individual client devices require, on behalf of the central controller. In the case of specific communications and control protocols, such as, Institute of Electrical and Electronics Engineers (IEEE) 2030.5 used for Distributed Energy Resources (DER), each proxy controllers can implement and represent the actions of a standard server in interactions with standard client devices. Another protocol, Modbus, is an example of the one of many standard protocols that may be used for communications between the proxy controller and DERs over the one of many wireless or wired local premise networks. This enhances system interoperability and expandability by allowing standardized client devices to be integrated into the overall control system. Each client device is able to interact and communicate with a proxy controller in a consistent and transparent manner just as it would if there were a singular central controller.

FIG. 1 illustrates an example communications and control architecture 100 in accordance with example embodiments. Communications and control architecture 100, for example, is a hierarchical distributed control structure to maximize utilization of DERs. As shown in FIG. 1, communications and control architecture 100 includes a central controller 102, a first network 104, an alternate first network 140, and a plurality of residences 106 (for example, a first residence $106_1$, a second residence $106_2$, . . . , a Nth residence $106_N$).

Central controller 102 is a computer system which includes one or more processors and one or more memories. Central controller 102 also includes a database 120. Database 120 of central controller 102 stores data including, but not limited to, customer data, network topology and operating data, geographic information, metering data, and energy transaction schedules. In examples, central controller 102 receives data, e.g., prices, reliability information, weather forecast, from a wholesale market, for example, an Independent System Operator (ISO). Central controller 102 also receives data from a distribution company, a transmission company, aggregators, and customers. The processor of central controller 102 processes the received data using data stored in database 120 and then generates signals based on the processed data. The generated signals are appropriate for procurement of energy, e.g., via DER such as turning on generators, or to cause portions of aggregated electrical storage generation and/or energy resources to be coupled to the electrical grid (e.g., through inverters), thus increasing supply to the grid. The generated signals can further cause adjustment of load, e.g., via Demand Response (DR) such as temporarily reducing utility consumption by pausing charging of an electric vehicle or a storage device, turning off air conditioning units, water heaters, and other customer assets.

Central controller 102 communicates with proxy controllers 130 in plurality of residences 106 via first network 104 or alternate first network 140, or a combination thereof. In examples, first network 104 and alternate first network 140 can be any suitable network for enabling communications between various entities, such as between central controller 102 and one or more proxy controllers 130 associated with plurality of residences 106. Such a network may include, for example, a local area network, a wide-area network, a virtual private network, the Internet, an intranet, an extranet, a public switched telephone network, an infrared network, a wireless network, a wireless data network, a cellular network, or any other such wired or wireless network(s) or combination(s) thereof. First network 104 may, furthermore, incorporate any suitable network topology. First network 104 and alternate first network 140 may utilize any suitable protocol. Communication over first network 104 or alternate first network 140 may be enabled by wired or wireless connections, and combinations thereof including low-speed/capacity and high-speed/capacity network connections. In some examples, first network 104 includes a radio frequency (RF) mesh/tower network, the Internet, a fifth generation (5G) cellular network, or a combination thereof. In other examples, first network 104 is an Advanced Metering Infrastructure (AMI) network and the alternate first network 140 may be a premise end-customer owned high speed internet access network.

Plurality of residences 106 are a variety of structures or enclosures that are associated with energy consumption. The structures may span a variety of structure types, such as private residences, houses, apartments, condominiums, schools, commercial properties, single or multi-level office buildings, and/or manufacturing facilities. A number of examples described herein refer to the structure as being a private residence in the form of a house, but embodiments are not so limited as one skilled in the art would understand that the techniques described herein could equally be applicable to other types of structures. It is to be appreciated that, while some embodiments may be particularly advantageous for residential living scenarios, the scope of the present teachings is not so limited and may equally be advantageous for business environments, school environments, government building environments, sports or entertainment arenas, and so forth. Thus, while many of the descriptions below are set forth in residential living context, it is to be appreciated that this is for purposes of clarity of description and not by way of limitation.

Each of plurality of residences 106 may include a plurality of client devices, also referred to as edge devices. For example, first residence $106_1$ includes a first plurality of edge devices $108_1$, second residence $106_2$ includes a second plurality of edge devices $108_2$, . . . , Nth residence $106_N$ includes a Nth plurality of edge devices $108_N$. In examples, each of plurality of residences 106 can include a different number and a different set of client devices. For example, first plurality of edge devices $108_1$ of first residence $106_1$ may include loads $110_1$, a Heating Ventilation and Air Conditioning (HVAC) $116_1$ with connected smart thermostat $118_1$, a DER resource with inverter $112_1$, and a Home Energy Management System (HEMS) gateway $114_1$. First residence $106_1$ may also include one or more loads with a Load Control Relay (LCR). Loads $110_1$ may include energy consuming devices which may not have a controller associated with them such as televisions, microwaves, home audio equipment, heating/cooling systems, laundry machines, dishwashers, etc. DER resource with inverter $110_1$ may include a DER source $120_1$ and a DER source controller $122_1$ and an inverter $124_1$.

In examples, DER source $120_1$ may include electric vehicles, fuel cells, photovoltaics (PV), and energy storage devices, for example, batteries. DER source controller $122_1$ may control DER source $120_1$. For example, DER source controller $122_1$ may connect DER source $120_1$ to the electric grid for charging (that is, withdrawing power from the electric grid as a load) or for discharging (that is, providing power to the electric grid as an energy resource), or disconnect from the electric grid to be idle (that is, neither charging nor discharging).

HEMS gateway $114_1$ controls other energy consumption devices in first residence $106_1$. For example, first residence $106_1$ may include one or more energy consumption devices, which may be electrical energy consumption devices such as televisions, microwaves, home audio equipment, heating/cooling systems, laundry machines, dishwashers, etc. Similarly, energy consumption devices could include one or more other types of energy consumption devices such as gas consumption devices. For example, first residences $106_1$ may include a natural gas (air/water/etc.) heater, stove, fireplace, etc. In some examples, HEMS gateway $114_1$ can include an intelligent, network connected thermostat that is operable to control the thermal environment of the residence. In examples, DER source controller $122_1$, connected smart thermostat $118_1$, and HEMS gateway $114_1$ are also referred to as client control devices.

Second plurality of edge devices $108_2$ of second residence $106_2$ may include loads $110_2$, a DER resource with no inverter $126_2$, a DER resource with inverter $112_2$, and a HEMS gateway $114_2$. DER resource with no inverter $126_2$ may include a DER source $136_2$ and DER source controller $138_2$. DER resource with no inverter $126_2$ can only be used as a controllable load. DER source controller $138_2$ may control DER source $136_2$. For example, DER source controller $138_2$ may connect DER source $136_2$ to the electric grid for charging (that is, withdrawing power from the electric grid as a load) or disconnect from the electric grid to be idle (that is, neither charging nor discharging). DER resource with inverter $110_2$ may include a DER source $120_2$ and a DER source controller $122_2$, and an inverter $124_2$. In examples, DER source $120_2$ may include electric vehicles, fuel cells, PV, and storage devices, for example, batteries. DER source $120_2$ is connected to the electric grid through inverter $124_2$. Second DER source controller $122_2$ may control DER source $120_2$. For example, DER source controller $122_2$ may connect DER source $120_2$ to the electric grid for charging or discharging, or disconnect from the electric grid to be idle. HEMS gateway $114_2$ controls other energy consumption devices in second residence $106_2$.

Nth plurality of edge device $108_N$ of Nth residence $106_N$ may include loads $110_N$, Demand Response (DR) controllable load assets $128_N$, a DER resource with inverter $112_N$, and a HEMS gateway $114_N$. DR controllable load assets $128_N$ may include energy consuming devices which can be switched on or switched off for DR events. DER resource with inverter $112_N$ may include a DER source $120_N$, a DER source controller $122_N$, and an inverter $124_N$. In examples, DER source $120_N$ of Nth residence $106_N$ may include electric vehicles, fuel cells, PV, and storage devices, for example, batteries. Second DER source $120_N$ is connected to the electric grid through inverter $124_N$. DER source controller $122_N$ may control DER source $120_N$. For example, DER source controller $122_N$ may connect second DER source $120_N$ to the electric grid for charging or discharging, or disconnect from the electric grid to be idle. HEMS gateway $124_N$ controls other energy consumption devices in Nth residence $106_N$.

Each of plurality of residences 106 include a proxy controller of proxy controllers 130. For example, first residence $106_1$ includes a first proxy controller $130_1$, second residence $106_2$ includes a second proxy controller $130_2$, . . . , and Nth residence $106_N$ includes an Nth proxy controller $130_N$. In examples, first proxy controller $130_1$, second proxy controller $130_2$, . . . , and Nth proxy controller $130_N$ together are referred to as proxy controllers 130 or edge controllers 130. Although one proxy controller is shown to be associated with one residence, one proxy controller can be associated with more than one residence and/or more than one proxy controller can be associated with one residence. In some examples, a number of proxy controllers 130 per residence can be based on a number of client devices in the residence, an area of the residence, and/or desired granularity of control.

Each of proxy controllers 130 interacts with and controls the client devices or client control devices in a residence associated it. For example, first proxy controller $130_1$ interacts with and controls first plurality of edge devices $108_1$ of first residence $106_1$. Similarly, second proxy controller $130_2$ interacts with and controls second plurality of edge devices $108_2$ of second residence $106_2$ continuing to Nth proxy controller $130_N$ which interacts with and controls Nth plurality of edge devices $108_N$ of Nth residence $106_N$.

Each proxy controllers 130 interacts with and controls the client devices in a residence with which it is associated through second networks 132, for example, first second network $132_1$, second second network $132_2$, ..., Nth second network $132_N$, or through alternate second networks 134, for example, first alternate second network $134_1$, second alternate second network $134_2$, ..., Nth alternate second network $134_N$, or a combination thereof. For example, first proxy controller $130_1$ interacts with and controls first plurality of edge device $108_1$ of first residence $106_1$ through first second network $132_1$, though first alternate second network $134_1$, or a combination thereof. Similarly, second proxy controller $130_2$ interacts with and controls second plurality of edge device $108_2$ of second residence $106_2$ through second second network $132_2$, though second alternate second network $134_2$, or a combination thereof. Nth proxy controller $130_N$ interacts with and controls Nth plurality of edge device $108_N$ of Nth residence $106_N$ through Nth second network $132_N$, though Nth alternate second network $134_N$, or a combination thereof.

Hence, each of proxy controllers 130 can interact with and control the client devices in a residence with which it is associated through more than one network. For example, first proxy controller $130_1$ can interact with and control first plurality of edge device $108_1$ of first residence $106_1$ through a local extension of an RF mesh AMI network as well as a premise WiFi network. In another example, first proxy controller $130_1$ can interact with and control some of first plurality of edge device $108_1$ of first residence $106_1$ through an AMI network and some other of first plurality of edge device $108_1$ of first residence $106_1$ through a premise-provided combined Wide Area Network (WAN) and Local Area Network (LAN). In some examples, each of second networks 132 is based on use of IEEE 2030.5 protocol as the application control protocol over a wireless network. In some other examples, one or more of second networks 132 are based on different protocols from one another. For example, first second network $132_1$ can be based on Transmission Control Protocol (TCP)/Internet Protocol (IP) wireless communications while second second network $132_2$ can be based on serial wired communications. The flexibility with the use of different protocols enhances communications and control architecture 100 interoperability and expandability by allowing different types of plurality of proxy controllers 106 to be integrated with the premise DR and DER devices.

Each proxy controllers 130 interacts with and controls the client devices in a residence associated with it based on information or notification received from central controller 102. For example, each proxy controllers 130 may receive information or a communication from central controller 102 over first network 104 or alternate first network 140. The information or the communication from central controller 102 can be related to a grid event, for example, a demand response event, an upcoming price adjustment event, or to cause portions of DER resources to be coupled to the electrical grid (e.g., through inverters), thus increasing supply to the grid.

The information or the communication from central controller 102 can be uniformly broadcasted message and each proxy controllers 130 may receive the same information or the communication in a same format supported by first network 104. This results in a reduction of the number of messages and amount of data required to convey the information or the communication from central controller 102 as the information or the communication from central controller 102 is provided to proxy controllers 130 that too in a uniformly broadcasted message. Central controller 102 can also communicate specific information to individual proxy controllers 130 in response to specific aggregated information received from proxy controllers 130.

Each of proxy controllers 130 can generate local messages for client devices in a residence associated it based on the information or the communication received from central controller 102. For example, for a DR event, or other grid service event, first proxy controller $106_1$ can generate one or more messages for first plurality of edge device $108_1$, that is, thermostat $118_1$, DER source controller $122_1$, HEMS gateway $114_1$, and a LCR connected to a load, based on the information or the communication received from central controller 102 for the service event. For example, first proxy controller $106_1$ can generate a command for DER resource $122_1$ to dispatch energy from DER source $120_1$ to the grid. In another example, first proxy controller $106_1$ can generate a command for thermostat $118_1$ to adjust temperature setting of the premise.

The messages generated by proxy controllers 130 can be based on a format or a protocol associated with second networks 132 connecting each of proxy controllers 106 with the client devices in the residence associated it. For examples, first proxy controller $106_1$ can generate one or more messages for each of first plurality of edge devices $108_1$ based on IEEE 2030.5 protocol supported by first second network $132_1$. Thus, proxy controllers 130 can translate messages between different formats.

In addition, each of proxy controllers 130 can receive information from the client devices in a residence associated it. For example, first proxy controller $130_1$ can receive one or more messages from one or more of first plurality of edge device $108_1$, that is, thermostat $118_1$, DER resource $112_1$, and HEMS gateway $114_1$ regarding a current power consumption rate, a current power generation rate, a remaining charge, a current temperature, a current efficiency, etc. First proxy controller $130_1$ can receive the one or more messages for first plurality of edge devices $108_1$ through first second network $132_1$ or first alternate second network $134_1$.

Each proxy controllers 130 can process the received information from the client devices in a residence associated it. For example, first proxy controller $130_1$ can process the information received each of thermostat $118_1$, DER resource $112_1$, HEMS gateway $114_1$, and a LCR. In addition, first proxy controller $130_1$ can receive energy consumption data for first plurality of edge device $108_1$ and process the received energy consumption data. The processing of received information can be controlled by central controller 102. For example, central controller 102 may provide with a format for processing and storing the information received from plurality of edge devices 108. Each of proxy controllers 130 can then send the processed information to central controller 102 through first network 104 or alternate first network 140. In addition, each of plurality proxy controllers 130 can control response to a DR event or a grid event by the client devices based on processing of the received information from the client devices in a residence associated it. For example, based on the processing of the consumption data received from a premise energy metering device and a DR event received from central controller 104, first proxy controller $130_1$ can generate load control messages to one or more thermostat $118_1$, DER source controller $122_1$, and HEMS gateway $114_1$ to comply with the DR event.

Such processing of the information by proxy controllers 130, including information that may be locally derived through processing of high-frequency electric meter-reading, can reduce processing load on central controller 102. In addition, such processing of the information by proxy controllers 130 can reduce the amount of data being sent back to central controller 102. This may lead to overall increased efficiency. Additionally, by coordinating the activity of a much smaller subset of the client devices that may have a shared local domain, each of proxy controllers 130 supports further optimized local control within the edge domain while still being able to represent and reflect the control directives of central controller 102. In examples, each of proxy controllers 130 can be located in a meter device of a residence associated with it and can include a processor and a memory.

In examples, the elements of communications and control architecture 100 may be practiced in hardware and/or in software (including firmware, resident software, microcode, etc.) or in any other circuits or systems. The elements of communications and control architecture 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of communications and control architecture 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of communications and control architecture 100 may be practiced in a computing device 300.

Figure 2:
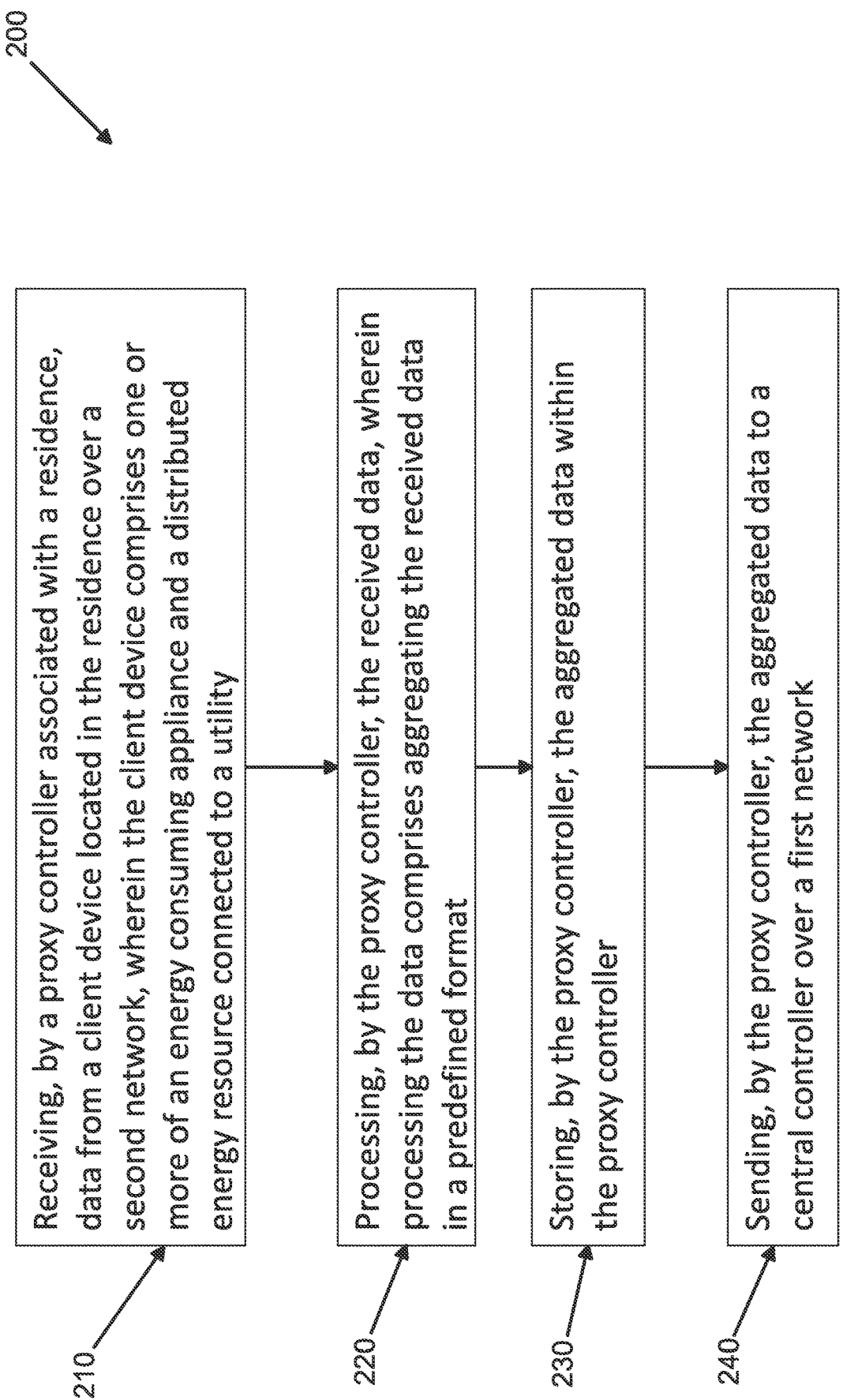
FIG. 2 illustrate a flow diagram of a method for transmitting and receiving data from a client device of a utility.

FIG. 2 is a flow diagram setting forth the general stages involved in a method 200 consistent with an embodiment of the disclosure for transmitting and receiving data from a client device of a utility. Method 200 may be implemented using proxy controllers 130 as described in more detail above with respect to Figure. However, embodiments of the disclosure may be implemented by any computing device, for example, a computing device 300 as described in greater detail in FIG. 3 below. Furthermore, method 200 may be performed anywhere, for example, at home plurality of residence 106s or on in the cloud. Ways to implement the stages of method 200 will be described in greater detail below.

At block 210 of method 200, one or more of proxy controllers 130 associated with a residence 106 receives data from a client device located in the residence over second networks 132 or alternate second networks 134. The client device can include one or more of an energy consuming appliance and a distributed energy resource connected to the electric grid. For example, first proxy controller $130_1$ can receive consumption data from first plurality of edge devices $108_1$ associated with first residence $106_1$ over first second network $132_1$ or first alternate second network $134_1$. First proxy controller $130_1$ can receive consumption data for first plurality of edge devices $108_1$ associated with first residence $106_1$ from an energy metering device associated with first residence $106_1$.

At block 220 of method 200, proxy controllers 130 can process the received data. Processing the data can include aggregating the received data in a predefined format. For example, first proxy controller $130_1$ can process the received consumption data for first plurality of edge devices $108_1$ associated with first residence $106_1$. Processing can include aggregating the consumption data to determine a load pattern or to create a consumption profile of first plurality of edge devices $108_1$. In some examples, the aggregation is performed in a format dictated by central controller 102.

At block 230 of method 200, proxy controllers 130 can store the aggregated data within proxy controllers 130. For example, first proxy controller $130_1$ can store the aggregated consumption data of first plurality of edge devices $108_1$ on a storage on first proxy controller $130_1$.

At block 240 of method 200, proxy controllers 130 can send the aggregated data to central controller 102 over first network 104, alternate first network 140, or a combination thereof. For example, first proxy controller $130_1$ can send the stored aggregated consumption data of first plurality of edge devices $108_1$ to central controller 102 over first network 104, alternate first network 140, or a combination thereof. In some examples, first proxy controller $130_1$ can anonymize the aggregated consumption data before sending to central controller 102. This can enhance privacy and security of first residences $106_1$.

By processing and aggregating of the data at proxy controllers 130, a load of central controller 102 is reduced. In addition, the processing and aggregating of the data at proxy controllers 130 leads to a reduction in the amount of data to be transferred from proxy controllers 130 to central controller 102. Moreover, the processing and aggregating of the data at proxy controllers 130 leads to a reduction in the amount of memory needed at central controller 102 to store the consumption date for the client devices.

In some examples, proxy controllers 130 are further operative to receive one or more notifications from central controller 102 over first network 104 or alternate first network 140 from central controller 102. For example, proxy controllers 130 can receive a DR event notification or a price change notification from central controller 102. The event notification can be received in a first protocol associated with first network 104, alternate first network 140, or a combination thereof. Proxy controllers 130 can process the one or more notifications. For example, proxy controllers 130 can process the DR event or price change notification received from central controller 102.

Proxy controllers 130 can generate one or more message based on the one or more notifications. For example, proxy controllers 130 can generate commands for plurality of client devices 106 based on processing of the event notifications received from central controller 102. Proxy controllers 130 can generate the commands in a second protocol supported by second networks 132 or alternate second networks 134. Proxy controllers 130 can send the one or more message to plurality of edge devices 108 over second networks 132 or alternate second networks 134. Proxy controllers 130 can monitor and collect data associated with the event from plurality of edge devices 108. Proxy controllers 130 can process, store, and send the collected data associated with the event to first controller 102 over first network 104, alternate first network 140, or a combination thereof.

Figure 3:
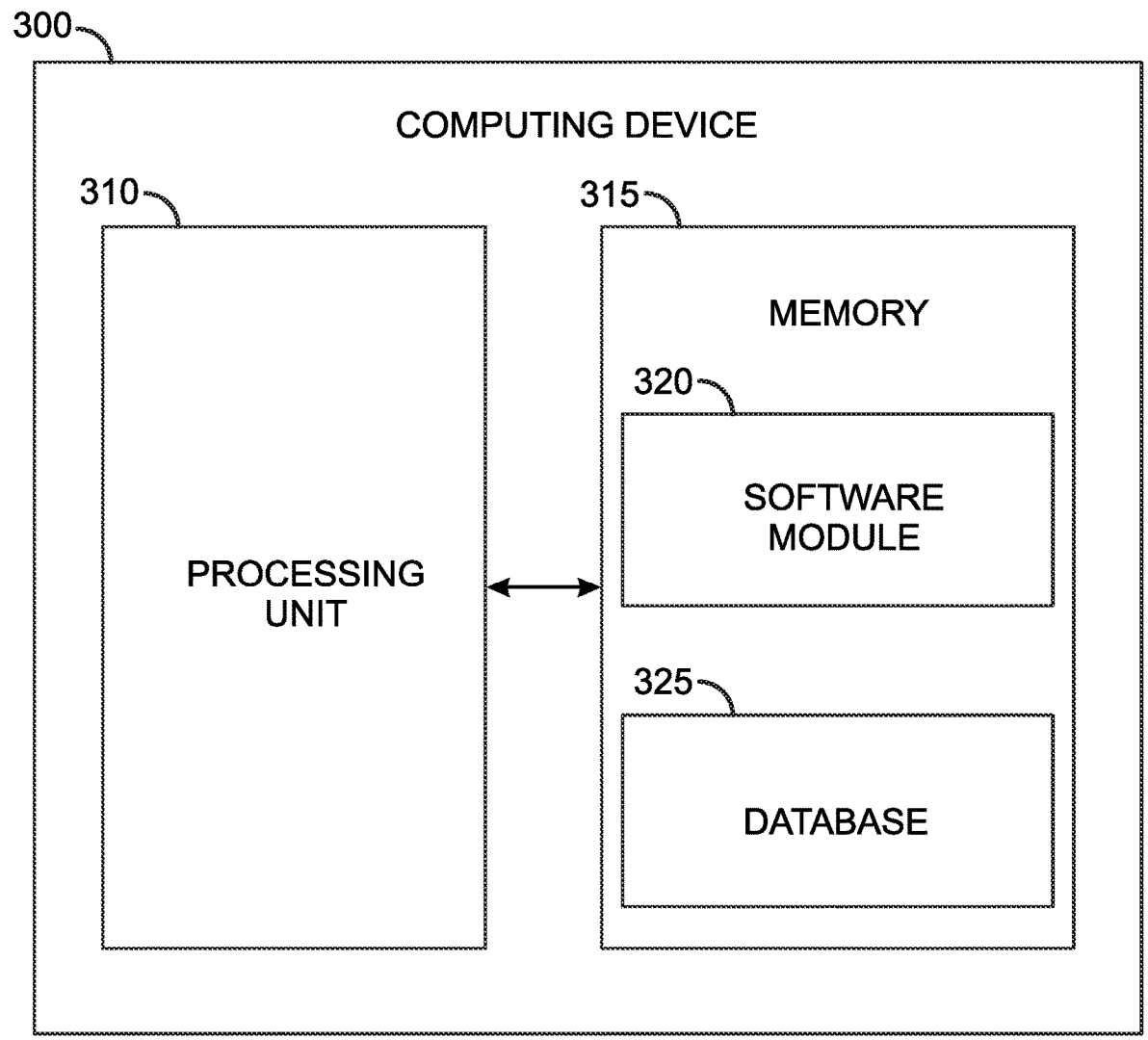
FIG. 3 illustrates a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for transmitting and receiving data from a client device of a utility as described above with respect to FIG. 2. Computing device 300, for example, may provide an operating environment for central controller 102, proxy controllers 130, plurality of edge devices 108. Central controller 102, proxy controllers 130, plurality of edge devices 108 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Various modifications and alternations of this disclosure will become apparent to those skilled in the art without departing from the scope and spirit of this disclosure, and it should be understood that the inventive scope of this disclosure is not to be unduly limited to the illustrative embodiments set forth therein.

Examples of the disclosure may be described according to the following aspects.

Aspect 1. A method comprising:
receiving, by a proxy controller associated with a residence, data from a client device located in the residence over a second network, wherein the client device comprises one or more of an energy consuming appliance and a distributed energy resource connected to a utility;
processing, by the proxy controller, the received data, wherein processing the data comprises aggregating the received data in a predefined format;
storing, by the proxy controller, the aggregated data within the proxy controller; and
sending, by the proxy controller, the aggregated data to a central controller over a first network.

Aspect 2. The method of aspect 1, wherein the first network is associated with a first protocol and the second network is associated with a second protocol, the second protocol being different from the first protocol.

Aspect 3. The method of aspect 1, further comprising: registering, by the proxy controller, one or more client devices located in the residence.

Aspect 4. The method of aspect 1, wherein receiving the data comprises receiving the data comprises one or more of energy consumption data and energy capacity data.

Aspect 5. The method of aspect 1, further comprising:
receiving, by the proxy controller, a notification of an upcoming event;
determining, by the proxy controller, another client device affected by the upcoming event; and
sending, by the proxy controller, a first notification message to the another client device determined to be affected by the upcoming event to notify the another client device of the upcoming event.

Aspect 6. The method of aspect 5, further comprising:
initiating, by the proxy controller, an event data process to monitor and collect data associated with the event; and
initiating, by the proxy controller, an event control process to control the another client device determined to be affected by the upcoming event.

Aspect 7. The method of aspect 5, wherein receiving the notification of the upcoming event comprises receiving the notification of the upcoming message as a broadcast message.

Aspect 8. The method of aspect 5, wherein the upcoming event comprises a grid service event.

Aspect 9. The method of aspect 1, wherein sending the aggregated data to the central controller over the second network comprises anonymizing the aggregated data before sending to the central controller.

Aspect 10. A system comprising:
a proxy controller located at a residence;
a first network configured to transmit and receive data between a central controller associated with a utility network and the proxy controller; and
a second network configured to transmit and receive data between the proxy controller and a client device in the residence, wherein the proxy controller is operative to:
receive one or more notifications from the central controller over the first network,
process the one or more notifications,
generate one or more message based on the one or more notifications, and
send the one or more message to the client device over the second network.

Aspect 11. The system of aspect 10, wherein the first network comprises a utility radio frequency mesh advanced metering infrastructure network.

Aspect 12. The system of aspect 10, wherein the second network comprises a WiFi network.

Aspect 13. The system of aspect 10, wherein the first network comprises a fifth generation (5G) cellular network.

Aspect 14. The system of aspect 10, wherein the notification comprises utility pricing information.

Aspect 15. The system of aspect 10, wherein the notification comprises a demand response or other grid service event.

Aspect 16. A system comprising:
a proxy controller located at a residence;
a first network configured to transmit and receive data between a central controller associated with a utility network and the proxy controller; and
a second network configured to transmit and receive data between the proxy controller and a client device in the residence, wherein the proxy controller is operative to:
receive data from the client device over the second network,
aggregate the received data in a predefined format,
store the aggregated data within the proxy controller, and
send the aggregated data to a central controller over the first network.

Aspect 17. The system of aspect 16, wherein the client device comprises a distributed energy resource.

Aspect 18. The system of aspect 16, wherein the second network comprises a home area network.

Aspect 19. The system of aspect 16, wherein the data comprises consumption data.

Aspect 20. The system of aspect 16, wherein the proxy controller is located at a utility meter of the residence.

What is claimed is:

1. A method comprising:
receiving, by a proxy controller located in a residence, energy consumption data directly from a plurality of client devices located in the residence over a second network, wherein the energy consumption data is received in a format supported by the second network and the plurality of client devices, and wherein the plurality of client devices comprises one or more of an energy consuming appliance and a distributed energy resource connected to a utility;
processing, by the proxy controller, the energy consumption data, wherein processing the energy consumption data comprises aggregating the energy consumption data by the proxy controller in the residence in a predefined format dictated by a central controller, wherein the predefined format is associated with a first protocol supported by a first network, and wherein the proxy controller is proxy to the central controller;
storing, by the proxy controller, the aggregated energy consumption data within the proxy controller; and
sending, by the proxy controller, the aggregated energy consumption data to the central controller over the first network.

2. The method of claim 1, wherein the first network is associated with the first protocol and the second network is associated with a second protocol, the second protocol being different from the first protocol.

3. The method of claim 1, further comprising:
registering, by the proxy controller, one or more client devices of the plurality of client devices located in the residence.

4. The method of claim 1, wherein receiving the energy consumption data further comprises receiving energy capacity data.

5. The method of claim 1, further comprising:
receiving, by the proxy controller, a notification of an upcoming event;
determining, by the proxy controller, a client device of the plurality of client devices affected by the upcoming event; and
sending, by the proxy controller, a first notification message to the client device determined to be affected by the upcoming event to notify a second client device of the plurality of client devices of the upcoming event.

6. The method of claim 5, further comprising:
initiating, by the proxy controller, an event data process to monitor and collect event data associated with the upcoming event; and
initiating, by the proxy controller, an event control process to control the client device determined to be affected by the upcoming event.

7. The method of claim 5, wherein receiving the notification of the upcoming event comprises receiving the notification of the upcoming event as a broadcast message.

8. The method of claim 5, wherein the upcoming event comprises a grid service event.

9. The method of claim 1, wherein sending the aggregated energy consumption data to the central controller over the second network comprises anonymizing the aggregated energy consumption data before sending to the central controller.

10. A system comprising a proxy controller and a central controller, the proxy controller comprising:
a memory storage; and
a processor coupled to the memory storage, wherein the processor is operative to:
receiving, by the proxy controller located in a residence, energy consumption data directly from a plurality of client devices located in the residence over a second network, wherein the energy consumption data is received in a format supported by the second network and the plurality of client devices, and wherein the plurality of client devices comprises one or more of an energy consuming appliance and a distributed energy resource connected to a utility;
processing, by the proxy controller, the energy consumption data, wherein processing the energy consumption data comprises aggregating the energy consumption data by the proxy controller in the residence in a predefined format dictated by the central controller, wherein the predefined format is associated with a first protocol supported by a first network, and wherein the proxy controller is proxy to the central controller;
storing, by the proxy controller, the aggregated energy consumption data within the proxy controller; and
sending, by the proxy controller, the aggregated energy consumption data to the central controller over the first network.

11. The system of claim 10, wherein the first network comprises a utility radio frequency mesh advanced metering infrastructure network.

12. The system of claim 10, wherein the second network comprises a WiFi network.

13. The system of claim 10, wherein the first network comprises a fifth generation (5G) cellular network.

14. The system of claim 10, wherein the processor is further operative to receive a notification from the central controller, wherein the notification comprises utility pricing information.

15. The system of claim 10, wherein the processor is further operative to receive a notification from the central controller, wherein the notification comprises a demand response or other grid service event.

16. A system comprising:
a proxy controller located at a residence;
a first network configured to transmit and receive first data between a central controller associated with a utility network and the proxy controller; and
a second network configured to transmit and receive second data between the proxy controller and a plurality of client devices in the residence, wherein the proxy controller is operative to:
receive energy consumption data directly from the plurality of client devices located in the residence over the second network, wherein the energy consumption data is received in a format supported by the second network and the plurality of client devices, and wherein the plurality of client devices comprises one or more of an energy consuming appliance and a distributed energy resource connected to a utility
aggregate the energy consumption data at the residence in a predefined format dictated by the central controller, wherein the predefined format is associated with a first protocol associated with the first network, and wherein the proxy controller is proxy to the central controller,
store the aggregated energy consumption data within the proxy controller, and
send the aggregated energy consumption data to the central controller over the first network.

17. The system of claim 16, wherein the plurality of client devices comprises a distributed energy resource.

18. The system of claim 16, wherein the second network comprises a home area network.

19. The system of claim 16, wherein the second data comprises the energy consumption data.

20. The system of claim 16, wherein the proxy controller is located at a utility meter of the residence.

* * * * *